Dec. 30, 1952  F. H. GERMANS  2,623,927
MEASURING OF THE STANDARD DEVIATION
Filed Jan. 31, 1950  2 SHEETS—SHEET 1
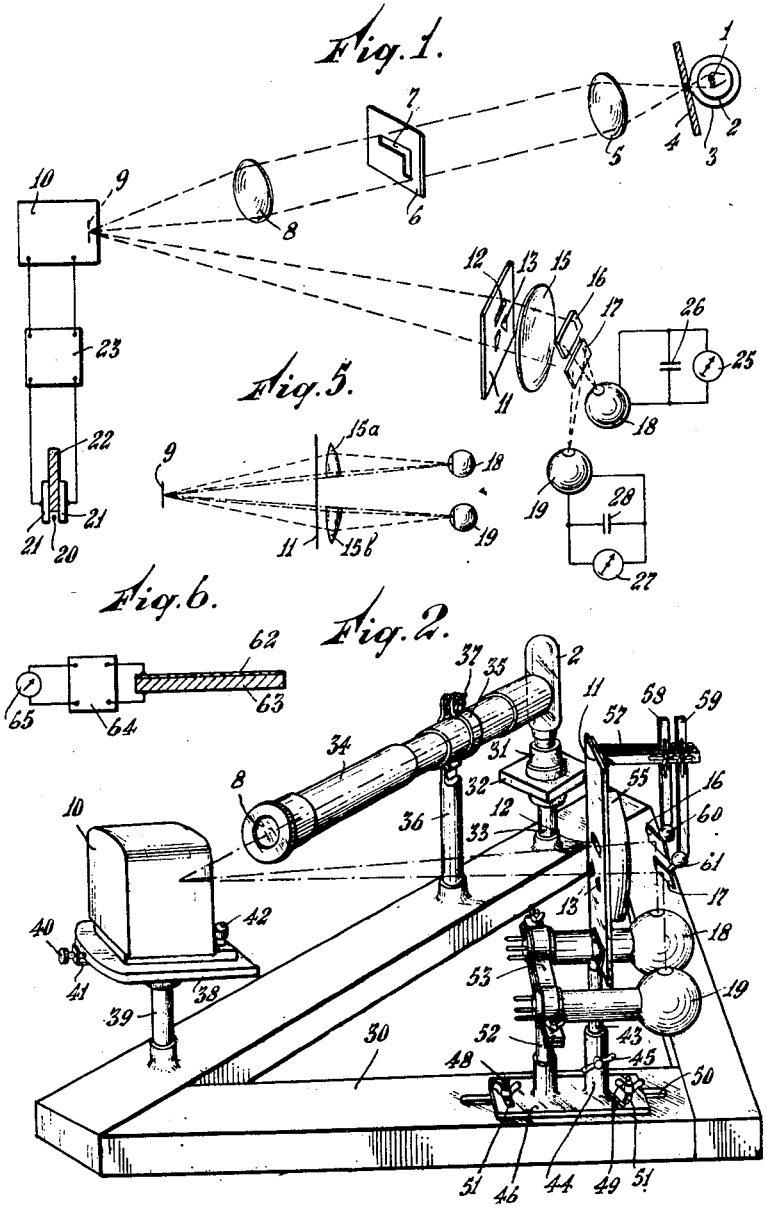

Dec. 30, 1952  F. H. GERMANS  2,623,927
MEASURING OF THE STANDARD DEVIATION
Filed Jan. 31, 1950  2 SHEETS—SHEET 2

Patented Dec. 30, 1952

2,623,927

UNITED STATES PATENT OFFICE 2,623,927

MEASURING OF THE STANDARD DEVIATION

Fedde Hendrik Germans, Delft, Netherlands, assignor to de Nederlandse Organisatie voor Toegepast-Natuurwetenschappelijk Onderzoek ten behoeve van Nijverheid, Handel en Verkeer, The Hague, Netherlands, a corporation of the Netherlands Application January 31, 1950, Serial No. 141,403
In the Netherlands July 14, 1947

14 Claims. (Cl. 175—183)

This is a continuation-in-part of my application Serial No. 36,554 filed July 1, 1948.

The invention relates to the determination of the standard deviation of a dimension from a predetermined standard, such as the thickness of articles to be measured, and more particularly to means and methods therefor using an electrical tester.

The object of the invention is to provide a method and apparatus for ascertaining, with respect to a predetermined average dimension, dimentional deviations of an article to be measured.

Another object of the invention is to provide a method and apparatus for ascertaining the average mass per unit of length of thread-, tube- or sheetlike materials and for ascertaining at the same time the standard deviation with respect to said average mass.

These and other objects will be clear to those skilled in the art from the following description in connection with the drawings in which Fig. 1 presents a schematic diagram illustrating the invention;

Fig. 2 presents a view on an embodiment for mounting the optical part of the apparatus;

Fig. 3 shows some forms for the screens 6 and 11 of Figs. 1 and 2;

Fig. 5 is a schematic diagram showing another embodiment of the optical part of the apparatus;

Fig. 6 is a schematic diagram of a selenium cell connected with a current meter.

Figure 3:
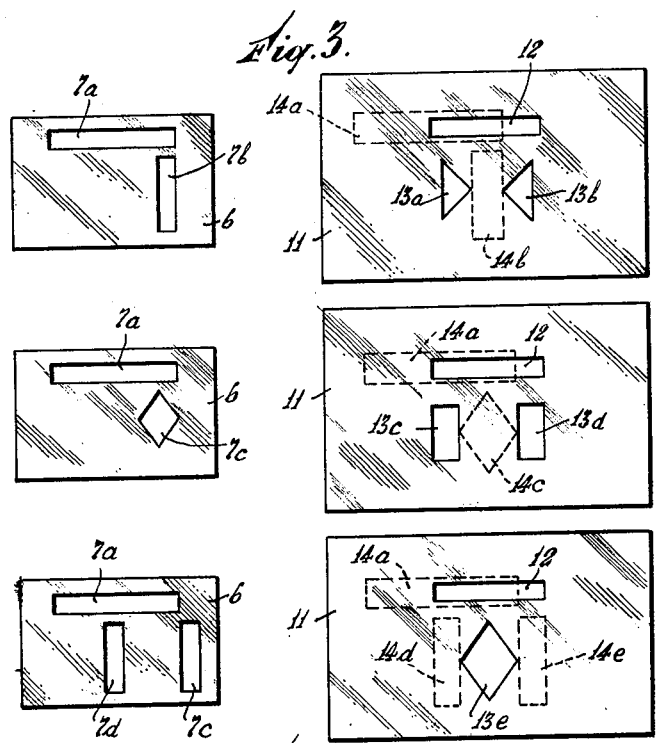
Figure 4:
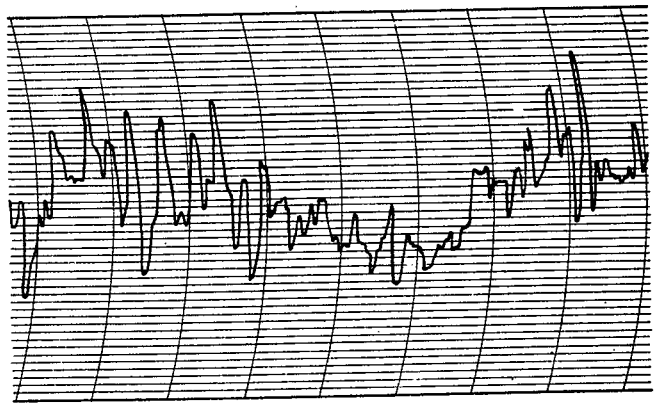
Fig. 4 is a diagram showing the variations in cross-section of a cotton thread recorded by means of a recording galvanometer.

In the drawings, 1 indicates a source of light, such as the incandescent filament of an electric lamp 2, the latter being surrounded by a shield 3 with a round opening. From the light coming from the lamp 2 a shaft or beam is isolated by a screen 4 having a narrow circular opening. Said shaft of light is converted into a parallel one by a lens 5 and passes a screen 6 provided with an aperture 7 having in the embodiment of this figure the form of a right angle, which form serves to give the shaft of light a special cross-sectional form. The remaining shaft of light is concentrated by a lens 8 to a plane mirror 9 of a mirror galvanometer 10, the focus falling somewhere about this mirror. The deflected shaft of light falls on screen 11, provided with apertures 12 and 13.

The light transmitted by screen 11 now being composed of two separate parts falls on a lens 15 which concentrates it and directs it via two plane mirrors 16 and 17 to photocells 18 and 19. The screens 6 and 11 and the lens 8 are positioned so as to give a sharp and sometimes enlarged image of the aperture in screen 6 on screen 11. The lens 15 is positioned so as to give a sharp image of the filament 1 on each of the photocells 18 and 19.

An article to be measured, such as a textile thread, indicated by its cross-section 20 is led between the plates 21 of a testing condenser, which plates are mounted on an isolating strip 22.

By means of an electrical oscillator, an amplifier and a demodulator—all of which are instruments known to one skilled in the art and indicated with 23—the variations in mass per unit of length of the thread between the condenser plates 21 are changed into variations of an electrical current directed through the galvanometer 10, causing movements of the galvanometer mirror 9, which movements are linearly proportional to said variations in the mass of thread 20.

In the embodiment of the invention according to Fig. 1, the photocells 18 and 19 are electrically connected (as shown) to condensers 26 and 28 respectively and to electrostatic voltmeters 25 and 27 respectively. Before a measurement the condensers 26 and 28 are given an electrical charge which can be read in volts from the electrostatic voltmeters 25 and 27 respectively.

During the measurement a certain amount of electric charge leaks away through the photocells 17 and 18, which amount can be found from the difference in voltmeter readings before and after the measurement.

The apertures in screens 6 and 11 may have different forms; three modifications are shown in Fig. 3, where on the left side modifications of screen 6 are shown and on the right side the corresponding embodiments of screen 11. The projections 14 of the apertures 7 as made by lens 8 in the corresponding screen 11 are indicated with dotted lines. In each case screen 7 has a rectangular slot with a projection 14a falling over a parallel rectangular slot 12 in screen 11.

The light beam transmitted by screen 11 is rectangular in cross-section and its variations are linearly proportional to the variations in the movement of the mirror 10 and to the variations in the amount of mass passing between the testing condenser. This linear section of the light is directed by lens 15 via the plane mirror 16 to the photocell 18. At a certain position of the mirror the projection 14b of the rectangular aperture 7b lies just between the two angles of the triangular apertures 13a and 13b which angles point to each other so that in this position no light passes this section of screen 11. On a movement of mirror 9 from said intermediate inoperative position to either of both sides, an amount of light triangular in cross section is transmitted and is directed by lens 15 via the plane mirror 17 towards photocell 19.

The surface of the triangular cross-section of said light transmitted by aperture 13a or 13b is proportional to the square of the movement of mirror 9 from said intermediate inoperative position and consequently to the square of the variations in the thread 20. The same effect can be reached by means of a rhomboid aperture 7e in screen 6 and two rectangular openings 13c and 13d in screen 11 or with two rectangular apertures 7d and 7e in screen 6 and a rhomboid aperture 13e in screen 11.

The optical part of the apparatus is mounted on a strong frame 30 preferably of angle iron as shown in Figure 2. The lamp 2 is mounted in a holder 31 and a foot 32; the screen 4, lens 5, screen 7 and lens 8 being mounted in a telescopic tube 34 wherein the relative position of each of them can be changed. This tube 34 is attached to the frame 30 with a brace 35 on a foot 36. The galvanometer 10 is mounted on a platform 38 which in turn is mounted in a rotary manner on a foot 39. The change of position of the galvanometer 10 with respect to the optical path can be done after loosening screw 40 which is mounted so as to fix the platform 38 to the foot 39 by means of the strap 41. Only one of the electrical contacts 42 of galvanometer 10 is shown in the figure. The screen 11 is mounted adjustable by means of a rod 43 in a socket 44, the latter being erected on an iron plate 46 which is attached to the frame 30 by means of two screws with units 48 and 49. As these screws 48 and 49 can slide along the slot 50 in frame 30 and along curved slots 51 in plate 46, the position of the latter is adjustable.

On plate 46 also a rod 52 is erected on which two braces 53 are mounted for holding the caps of the photocells 18 and 19 respectively.

Lens 15 is mounted in a ring 55 adjusted to screen 11.

The mirrors 16 and 17 are adjustably attached to screen 11 by means of a brace 57 and two adjustable rods 58 and 59 respectively, which rods have ball-joints 60 and 61 respectively.

As to lens 15 when no mirrors are used between lens 15 and the cells 18 and 19 the lens 15 can be composed of two separate halves 15a and 15b, each of them being arranged with the optical axis thereof extending in the direction defined by the mirror 9 and the photocell 18 or 19 respectively, as shown in Fig. 5.

It is possible instead of each of the photocells 18 and 19 and their condensers 26 and 28 and meters 25 and 27 to apply a selenium cell as indicated in Fig. 6, which cell consists mainly of a thin layer of selenium 62 and a piece of metal 63 such as iron, this cell being electrically connected to an electrical amplifier 64 and a current meter 65, which latter serves to indicate the amplified current generated by the light falling on the selenium cell.

When applying a suitable current meter the amplifier 64 can be dropped. A condition essential for a satisfactory measurement with selenium cells is that the average thickness to be measured within periods of time which are short with respect to the relaxation time of the moving system of meters 65 must be constant.

To calibrate the apparatus as shown in Figs. 1 and 2, the condensers 26 and 28 are given an electrical charge, measured with $V_1$ and $V_2$ by means of the meters 25 and 27 respectively. After a known constant electric current $i$ is directed through the galvanometer 10 during a known time $t$, the new voltmeter readings are $V_3$ and $V_4$ respectively. Now $(i-a)t$ is proportional to $V_3-V_1$ and $(i-b)^2 t$ is proportional to $V_4-V_2$. The current $a$ at which no light passes the aperture 12 and the current $b$ at which no light passes apertures 13 can be determined. When the measurement is done with different currents and at different adjustments of galvanometer 10, the relation between the galvanometer current $i$ and the discharge of voltmeters 25 and 27 is known.

When $l$ denotes the length of the thread measured and $x$ the surface of the cross-section, the average cross-section $$\overline{x} = \frac{1}{l}\int_0^l x\, dl$$

and when the standard deviation is called $\sigma$ then $$\sigma^2 = \frac{1}{l}\int_0^l (x-\overline{x})^2 dl$$

The differences in voltmeter readings before and after the passing of a thread over a length through the testing condenser are a measure for $$\int_0^l (x-a)dl \text{ and } \int_0^l (x-b)^2 dl$$

respectively when $x$, $a$ and $b$ are expressed in arbitrary units as for example in micro-amperes. Since $$\int_0^l (x-a)dl = \int_0^l x\,dl - al = (\overline{x}-a)l$$

and since $a$ is known from the calibration $\overline{x}$ can now be calculated when $l$ is measured. Since $$\int_0^l (x-b)^2 dl = \int_0^l (x-\overline{x})^2 dl + (\overline{x}-b)^2 l = \sigma^2 l + (\overline{x}-b)^2 l$$

also $\sigma$ can now be calculated in arbitrary units as well as the important quantity $$\frac{\sigma}{\overline{x}}$$

the relative standard deviation, which is dimensionless.

When using selenium cells as indicated in Fig. 6 a similar calibration as described above is possible. The reading from the current meter of the linear part is a measure for $$\frac{1}{l}\int_0^l (x-a)dl$$

and the reading of the quadratic part is a measure for $$\frac{1}{l}\int_0^l (x-d)^2 dl$$

It was found that the amount of moisture in textile materials has only a minor influence on the result as expressed in the relative standard deviation.

It will now be clear from the foregoing description that my invention gives a simple method and apparatus to determine the relative standard deviation of all sorts of threads and also of tube- or sheetlike materials, which latter in the same simple manner as threads can be drawn through a testing condenser.

If desired it is also possible to build the apparatus only with the quadratic part, dropping the linear part. It is obvious that various other changes in form, proportion and minor details of construction may be resorted to without departing from the spirit or sacrificing any of the principles of the invention.

Having now described my invention I claim:

1. Apparatus for indicating the average dimension and at the same time dimensional deviations from said average dimension of an article to be measured by detecting means responsive to the amount of material located in it and including means for producing a shaft of light in cross-section having a substantially homogeneous light distribution; movable light deflecting means actuated by the detecting means and disposed in the path of said shaft of light capable of moving the shaft deflected thereby; two sets of light responsive indicator means capable of integrating and visually indicating the amount of light projected on the same; a first screen member disposed in the path of said shaft of light between said light producing means and said light deflecting means, and formed with at least one aperture; a second screen member disposed in the path of said shaft of light between said light deflecting means and said light responsive indicating means, formed with apertures; and optical means disposed between said first screen member and said second screen member, located so as to give a sharp image of said aperture in said first screen member upon said second screen member; one of said apertures in said second screen member being substantially rectangular, and being shaped and located to pass upon operative movement of said light deflecting means, a varying substantially rectangular portion of said light shaft to one of said two sets of light responsive indicator means; the other of said apertures in said second screen member being shaped and located so as to transmit an operative movement of said light deflecting means, a second varying portion of said light shaft to the other of said light responsive indicator means, at a predetermined position of said deflected shaft of light said second varying portion of light being shut off and upon movement of said light deflecting means from the position corresponding with said shut off position, said second varying position of light being a square function of said movement of said light deflecting means.

2. Apparatus as defined in claim 1 having the aperture in said first screen member consisting of two slots, arranged at a right angle, one of said slots being parallel to the long side of said rectangular aperture in said second screen member; said other apertures in said second screen member consisting of two triangles, with their top angles pointing to each other and their bases being parallel.

3. Apparatus as defined in claim 1, the apertures in said first screen member consisting of two apertures, one being a rectangular slot, being parallel to the longer side of said rectangular aperture in said second screen, the other aperture in said first screen being a rhomboid positioned with one diagonal parallel to said rectangular slot; the other apertures in said second screen being two rectangles, positioned with their sides parallel to the diagonals of said rhomboid aperture in said first screen.

4. Apparatus as defined in claim 1, the apertures in said first screen member consisting of three rectangular slots, of which two are situated parallel to each other and the third is situated rectangular to said two slots; the apertures in said second screen member consisting of one rectangular slot parallel to said third slot in said first screen member, and an aperture of rhomboid form, situated with one diagonal parallel to said rectangular slot in said second screen.

5. Apparatus for indicating the average dimension and at the same time dimensional deviations from said average dimension of an article to be measured by detecting means, comprising in combination, a light source; optical means for producing a shaft of light, in cross-section having a substantially homogeneous light distribution; movable light deflecting means, such as a mirror galvanometer, actuated by the detecting means and disposed in the path of said shaft of light, capable of moving said shaft deflected thereby; two sets of flight responsive indicator means capable of integrating and visually indicating the amount of light projected on the same; a first screen member disposed in the path of said shaft of light between said light producing means and said light deflecting means, provided with apertures from which at least one is a rectangular slot; a second screen member disposed in the path of said shaft of light between said light deflecting means and said light responsive indicator means, having a rectangular slot being parallel to said slot in said first screen and further two apertures such as two triangles pointing with their top angles to each other, said slot and said other apertures transmitting separate shafts of light; optical means disposed in the optical path of said shaft of light between said first screen member and said movable light deflecting means, located so as to give a sharp image of said light source upon said movable light deflecting means; said first screen member and said second screen member being located in such a way that said optical means gives a sharp image of said first screen member upon said second screen member; and optical means disposed in the optical path of said shaft of light between said second screen member and said light responsive indicator means so as to give a sharp image of said light source upon both of said light indicator means; each of said sets of light responsive indicator means being located in the optical path of one of said two separate shafts of light transmitted by said second screen member.

6. Apparatus as defined in claim 5, said optical means located in the path of said shaft of light between said second screen member and said light responsive indicator means consisting of a lens and two mirrors; one of said mirrors being arranged to deflect one of said separate shafts of light transmitted by said second screen member to one of said two sets of light responsive indicator means and the other of said mirrors being arranged to deflect at least another of said separate shafts of light to the other of said two sets of light responsive indicator means.

7. Apparatus as defined in claim 5, said optical means being composed of a lens divided in two halves along a plane through the optical axis, one of said halves being disposed with the optical axis thereof extending in the direction defined by the movable part of one of said movable light deflecting means and one of said two sets of light responsive indicator means and the other of said halves being disposed with the optical axis thereof extending in the direction defined by the other of said movable light deflecting means and the other of said two sets of light responsive indicator means.

8. Apparatus as defined in claim 5, said means responsive to the amount of material located in it for moving said light deflecting means so as to position it in accordance with the magnitude of said amount of material being a capacitive tester, connected with an electrical oscillator, an amplifier and a demodulator.

9. An apparatus for measuring and indicating changes in the thickness of an elongated article by electric detecting means, comprising in combination, light emitting means emitting a beam of light having a uniform light intensity throughout its cross-section; a first screen member located in the path of said beam of light; deflecting means located in the path of said beam of light behind said first screen member and actuated by the electric detecting means to move to an extent depending in a linear function on changes of the amount of material of the portion of the elongated article passing through the detecting means out of an inoperative position corresponding to the desired predetermined amount of material; light responsive indicator means located in the path of said beam of light behind said deflecting means and adapted to indicate the amount of light projected therefrom; a second screen member located in the path of said beam of light intermediate said deflecting means and said light responsive indicator means and shutting off said beam of light when said deflecting means are in said inoperative position, each of said screen members being formed with at least one opening, and one of said openings in said screen members having at least one triangular portion, the openings in said first and said second screen members cooperating to permit passing of a portion of said beam of light having a triangular cross-section to said light responsive indicator means when said deflecting means move out of the inoperative position, said triangular cross-section and the amount of light passing to said light responsive indicator means being a square function of the movement of said deflecting means and of the changes in the amount of the material passing through the detecting means.

10. An apparatus for measuring and indicating changes in the thickness of an elongated article by electric detecting means, comprising in combination, light emitting means emitting a beam of light having a uniform light intensity throughout its cross-section; a first screen member located in the path of said beam of light and formed with at least one aperture shaped so as to split said beam of light into two beam portions; deflecting means located in the path of said two beam portions behind said first screen member and actuated by the electric detecting means in two opposite directions to an extent depending on a linear function on the amount of material of the portion of the elongated article passing through the detecting means out of an inoperative position corresponding to the predetermined amount of material; two sets of light responsive indicator means located, respectively, in the paths of said two beam portions behind said deflecting means and adapted to indicate the amount of light projected thereupon; a second screen member located in the path of said two beam portions intermediate said deflecting means and said light responsive indicator means and shutting off said two beam portions when said deflecting means are in said inoperative position, said second screen member being formed with at least two apertures, one of said apertures in said screen members having at least one triangular portion, the apertures in said first and said second screen members cooperating to permit passing of a portion of one of said two beam portions having a triangular cross-section to one of said two sets of light responsive indicator means when said deflecting means move out of said inoperative position in one of said two opposite directions, said triangular cross-section and the amount of light passing through said light responsive indicator means being a square function of the movement of said deflecting means and of the changes in the amount of material passing through said detecting means, and further cooperating to permit passing of a portion of the other of said two beam portions having a rectangular cross-section and being a linear function of the movement of said deflecting means to the other of said two light responsive indicator means.

11. Apparatus as defined in claim 10, said sets of light responsive indicator means each consisting of a photoelectric cell, connected with a condenser and an electrostatic voltmeter.

12. Apparatus as defined in claim 10, said sets of light responsive indicator means each consisting of a light responsive selenium cell, connected with a current meter.

13. Apparatus as defined in claim 10, said sets of light responsive indicator means each consisting of a light responsive selenium cell, connected with an electrical amplifier and a current meter.

14. An apparatus for measuring and indicating changes in the thickness of an elongated article by electric detecting means, comprising in combination, light emitting means emitting a beam of light having a uniform light intensity throughout its cross-section; deflecting means located in the path of said beam of light behind said first screen member and actuated by the electric detecting means to move to an extent depending in a linear function on changes of the amount of material of the portion of the elongated article passing through the detecting means out of an inoperative position corresponding to the desired predetermined amount of material; light responsive indicator means located in the path of said beam of light behind said deflecting means and adapted to indicate the amount of light projected therefrom, said light responsive indicator means provided with apertures located and shaped for shutting off said beam of light when said deflecting means are in inoperative position, but permitting passing of a portion of said beam of light having a triangular cross-section to said light responsive indicating means when said deflecting means move out of the inoperative position whereby said light responsive indicator means are actuated by an amount of light being a square function of the movement of said deflecting means.

FEDDE HENDRIK GERMANS.

REFERENCES CITED

The following references are of record in the file of this patent:

UNITED STATES PATENTS

| Number | Name | Date |
|---|---|---|
| 2,173,681 | Dimmick | Sept. 19, 1939 |
| 2,200,863 | Schuck | May 14, 1940 |
| 2,277,285 | Wood | Mar. 24, 1942 |
| 2,285,152 | Firestone | June 2, 1942 |
| 2,367,614 | Rich | Jan. 16, 1945 |
| 2,497,042 | Doll | Feb. 7, 1950 |